(12) United States Patent
Linev

(10) Patent No.: US 8,295,433 B2
(45) Date of Patent: Oct. 23, 2012

(54) CARGO AND VEHICLE INSPECTION SYSTEM

(75) Inventor: Vladimir N. Linev, Minsk (BY)

(73) Assignee: Nauchno-Proizvodstvennoe Chastnoe Unitarnoe Predpriyatie ADANI, Minsk (BY)

( * ) Notice: Subject to any disclaimer, the term of this patent is extended or adjusted under 35 U.S.C. 154(b) by 231 days.

(21) Appl. No.: 12/746,849

(22) PCT Filed: May 5, 2010

(86) PCT No.: PCT/BY2010/000003
§ 371 (c)(1),
(2), (4) Date: Jun. 8, 2010

(87) PCT Pub. No.: WO2011/137504
PCT Pub. Date: Nov. 10, 2011

(65) Prior Publication Data
US 2011/0274242 A1    Nov. 10, 2011

(51) Int. Cl.
*G01N 23/02* (2006.01)
(52) U.S. Cl. .......................................... 378/57; 378/205
(58) Field of Classification Search ................... 378/57, 378/205
See application file for complete search history.

(56) References Cited

U.S. PATENT DOCUMENTS

| | | | |
|---|---|---|---|
| 4,809,314 A * | 2/1989 | Steele et al. | 378/205 |
| 5,132,995 A * | 7/1992 | Stein | 378/56 |
| 7,453,987 B1 | 11/2008 | Richardson | |
| 2004/0086078 A1 * | 5/2004 | Adams et al. | 378/57 |
| 2004/0247075 A1 * | 12/2004 | Johnson et al. | 378/57 |
| 2004/0251415 A1 | 12/2004 | Vebinski et al. | |
| 2006/0056584 A1 * | 3/2006 | Allman et al. | 378/57 |
| 2009/0086907 A1 | 4/2009 | Smith | |
| 2009/0279664 A1 * | 11/2009 | McNabb et al. | 378/62 |

FOREIGN PATENT DOCUMENTS

| EP | 1634169 | 3/2006 |
|---|---|---|
| WO | WO2009137698 | 11/2009 |
| WO | PCT/BY2010/000003 | 2/2011 |

* cited by examiner

*Primary Examiner* — Glen Kao
(74) *Attorney, Agent, or Firm* — Bardmesser Law Group

(57) ABSTRACT

An apparatus for X-ray scanning of vehicles includes a pulsed X-ray source generating X-rays. A collimator forms a fan-shaped beam from the X-rays. A detector detects the fan-shaped beam after it passes through a vehicle. A speed sensor measures a speed of the vehicle passing through the apparatus and providing an electrical output corresponding to the speed. An image formation module converts an output of the detector into an image of the vehicle, based on the measured speed of the vehicle. A cross-section of the fan-shaped beam is substantially similar to a width of the detector. The X-rays comprise primarily photons with energy between 2.5 and 9 MeV. A filter is adjacent to the collimator for filtering out low energy X-ray photons. A vehicle presence sensor can be used, whose output is used to turn the X-ray source on and off. An alignment platform can be used for aligning the fan-shaped beam with the detector. A frequency of the pulses is adjusted based on the speed of the vehicle. The X-ray source is turned off if the speed of the vehicle is below a predetermined threshold.

21 Claims, 12 Drawing Sheets

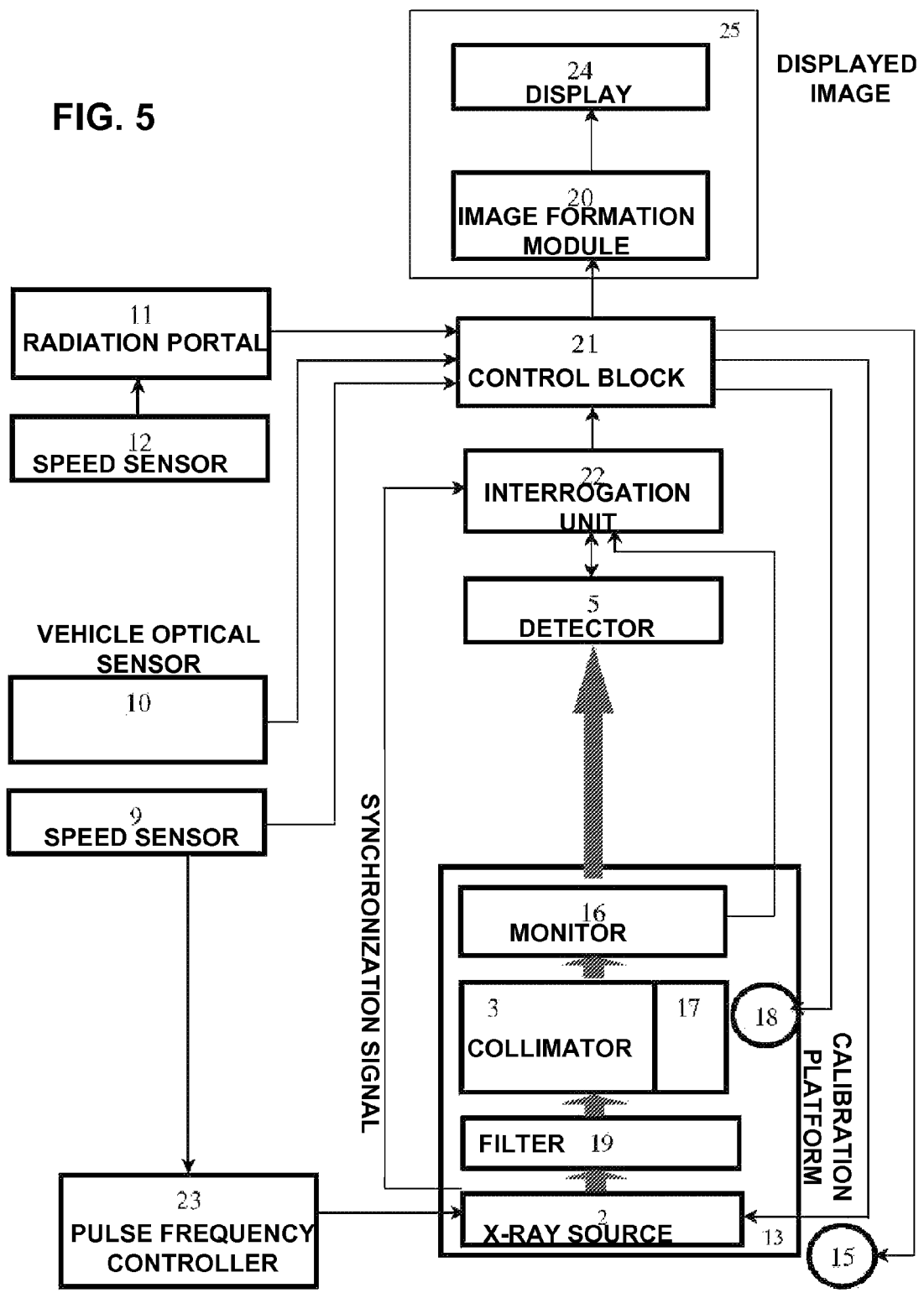

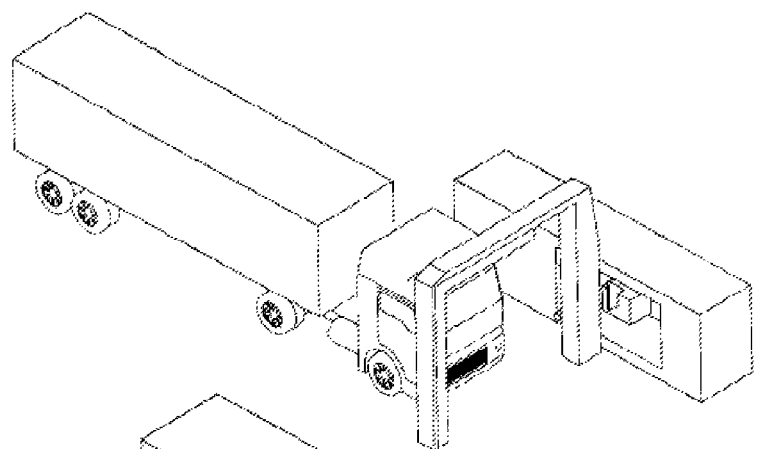
FIG. 6A
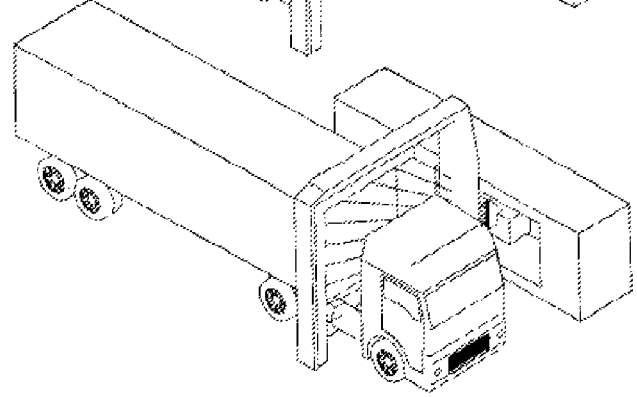
FIG. 6B
FIG. 6C
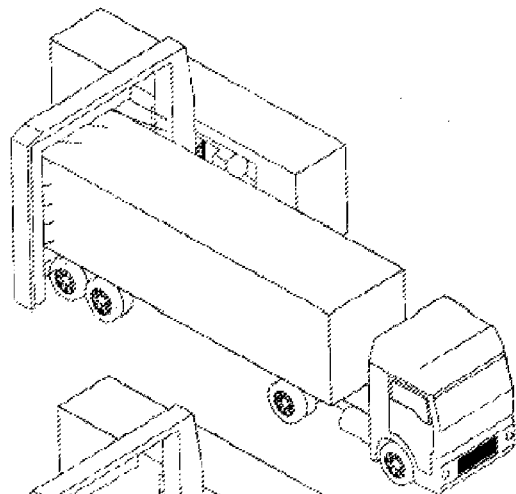
FIG. 6D
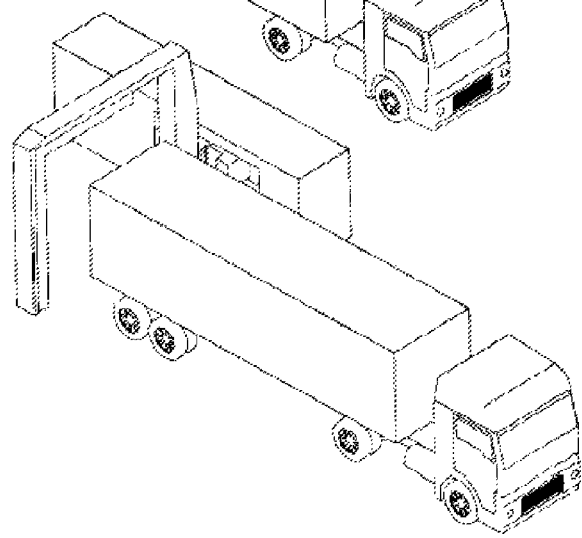

CARGO AND VEHICLE INSPECTION SYSTEM

CROSS-REFERENCE TO RELATED APPLICATIONS

This application is a National Phase of PCT/BY2010/000003, filed on May 5, 2010 which is incorporated by reference herein in its entirety.

BACKGROUND OF THE INVENTION

1. Field of the Invention

The present invention is directed to X-ray inspection technology, and more particularly, to a system and method for high-energy X-ray inspection of loaded vehicles (container or general cargo), and more particularly, to effective screening cargo at critical facilities, seaports and border crossing.

2. Description of the Related Art

Many systems for radiation inspection of trucks and containers are known, most of which are, generally, based on the same principle, general of X-ray radiation by and X-ray source, forming, using a collimator, a fan-shaped X-ray beam directed at the vehicle, scanning the vehicle using the fan-shaped beam, and converting the detected radiation, after it passes through the vehicle, into a digital signal, which is then processed into an image for viewing by an operator. Such systems generally are designed with several goals in mind.

Some X-ray inspection systems are geared towards a high degree of mobility, primarily through the use of modular construction; see, for example, RU 2251683. Other systems solve the mobility problem by placing the X-ray source on one vehicle, while the detector is located on a different vehicle. The two vehicles are then electronically tied together, so that they move in sync with each other, see U.S. Pat. No. 6,937,692. Another alternative is placing the X-ray source on a vehicle, while the detector is located on a moving or rotatable portal. The portal moves along the vehicle or container that is being inspected, together with the vehicle on which the detector is located, see, for example, U.S. Pat. Nos. 5,692,028, 5,903,623, 7,517,149, 7,497,618, and FR 2808088.

Systems that have moving sources and detectors of X-ray radiation typically have fairly low throughput (measured in terms of number of vehicles per unit time), which is generally due to a relatively low scanning speed (typically in the range of 0.2-0.8 meters per second), as well as due to the need for the driver to leave the inspection area, or to at least stand sufficiently far from the radiation source (which results in substantial loss of time to both the operators of the inspection system and to the drivers); also, a relatively large area around the scanner needs to be reserved, due to the possible radiation exposure. Since the radiation source is mobile, and moves, therefore, the exclusion zone from where humans should not be present during scans correspondingly increases. Also, such systems suffer from reliability problems due to the presence of moving parts, and require significant maintenance efforts. Additionally, when both the source and the detector are in motion during the scan, the vibration effects cause fuzziness in the image, and lack of clarity. Therefore, one of the objectives of the present invention is to improve the quality of the data collected by the inspection station, while reducing its size, footprint, and maintenance requirements.

Stationary X-ray inspection systems are also known, where the vehicle is moved through the stationery portal on a special conveyor type mechanism (see, for example, U.S. Pat. Nos. 5,091,924 and 6,542,580). In this case, the problem of image quality is at least partly addressed, and the exclusion zone around the inspection station can be reduced. However, the throughput of such scanning system tends to be fairly low, due to low scanning speed, and the need for the driver of the vehicle to leave the inspection area due to high radiation dosage use.

The throughput of the scanner can be significantly increased in systems with stationery sources and detectors, if the vehicles move through the scanners on their own power, and under control of their drivers. The problem of radiation exposure for the driver is solved by only turning the X-ray source on after the driver has moved past the source (which can be detected, for example, by using a special tag or a bar code on the vehicle, see, for example, U.S. Pat. No. 7,308,076). However, full radiation safety is still not achieved in this case, for example, for people who might be in the cargo hold of a truck, such as illegal immigrants, or for the driver's themselves, who are still exposed to at least some scattered radiation. Thus, one of the objectives of the present invention is reducing the dosage of radiation used to scan the vehicle, while maintaining the quality of the image.

Also known are systems for detection of radioactive materials in an automobile, such as, for example, described in U.S. Pat. No. 7,239,245, which use an autonomous device with its own service personnel and control equipment. A heretofore unresolved problem however is forming an integrated system of monitoring a control that permits monitoring and detection of radioactive materials in automobiles and X-ray scanning and control from a single operations center.

U.S. Patent Publication No. 2009/086907 describes a method for X-ray control of automobiles that includes generation of X-ray radiation as to different energies by an X-ray source, forming, using a collimator of a fan-shaped X-ray beam that is directed at a automobile moving under its own power, detecting the X-ray beam after it passes through the automobile, and converting the detected X-ray beam into a digital electronic signal that can then be used to form an image of the automobile, taking into account the speed of the automobile.

U.S. Patent Publication No. 2009/086907 also describes a portal for X-ray scanning of an automobile, where the portal carries the collimator for forming the fan-shaped beam and also carries the detector of the X-rays. The portal also carries the electronics required for converting the detected radiation into a digital signal. In this case, the X-ray source and the collimator are located on a top bulkhead of the portal, which adds instability to the entire construction, while the X-ray detector is buried under the road. Also, the described system uses a relatively low energy radiation source (140 KeV), which is only useful for X-ray monitoring of cars, which typically have metal body thickness of about 3 mm. On the other hand, large automobiles, trucks, containers or container carriers typically cannot be scanned using the system, since they frequently have too much metal (often as much as 300 mm thick between the X-ray source and the detector), as well as due to the pressure exerted by the heavy vehicles on the road, which can affect the radiation detector buried under the road.

SUMMARY OF THE INVENTION

The present invention relates to a system and method for scanning vehicles, particularly large vehicles and cargo containers.

One of the objectives of the present invention is a system and method for low-dose X-ray monitoring and control of moving vehicles, where the vehicles include relatively large automobiles, trucks, containers and container carriers.

Another objective is providing a system and method for X-ray monitoring and control of vehicles that gives a close to 100% control and monitoring over all vehicles passing through the inspection station. Another objective is providing a system and method that uses a sufficiently low intensity radiation source, which is safe for both the operators of the equipment and for any people that might be located in the vehicles, regardless of where they are located.

Another objective is providing a system and method that can reliably detect radioactive materials being transported in the vehicles being inspected.

The objectives are achieved by a system that includes an X-ray source that forms a fan-shaped X-ray beam by using a collimator. The fan-shaped beam scans the object (such as a moving vehicle) that is moving under its own power. A detector on the opposite side of the moving vehicle detects the X-ray beam. The speed of the vehicle is measured. An image is formed, based on the detected radiation that takes into account the speed of the vehicle. The X-ray source is a low power source that generates high energy X-rays. The width of the fan-shaped X-ray beam is comparable to the width of the detector, and also, prior to beginning of the scan, the collimator slit is aligned with the direction of maximum intensity of the X-ray source and with the detector, based on maximizing the output signal of the detector. The system and method described herein can be used on both small and large vehicles, including trucks and containers, as well as on containers used in maritime shipping and aircraft shipping, as well as on railroad cars.

The X-ray source preferably includes electronics that can turn the X-ray source on and off, enabling scanning either the entire moving vehicle or only the cargo portion of the moving vehicle.

The frequency of the pulses can be reduced if the speed of the vehicle is low, or increased if the speed of the vehicle is high. If the vehicle speed is low or zero, the X-ray source can be turned off completely.

Additionally, the output signal of the detector is normalized prior to the scan, to calibrate the system.

Preferably, the pulse X-ray radiation source generates X-rays with the maximum energy from 2.5 to 9 MeV, preferably from 5 to 9 MeV, which can then be additionally filtered, in order to reduce the proportion of photons with low energy.

When the object being scanned is moving, it is also possible to detect the presence of a radioactive source in the vehicle, as well as the location of the source, based on the length of the object, but by using the data from the radiation portal, which are converted into a system of coordinates on the X-ray image, taking into consideration data received from the velocity measurement for the vehicle while it is moving through the radiation portal, and the subsequent X-ray scanning, which are then combined together with the X-ray image and is stored in the database.

As a further option, the collimator slit is aligned with the direction of the maximum intensity of the X-ray radiation from the source, and the collimator is moved relative to the focus of the source, in a direction perpendicular to the plane of the fan-shaped beam and/or rotating it about the axis of rotation that passes through the end of the collimator that is closest to the focus, until reaching the maximum detected signal value of the original fan-shaped beam, which is located directly next to the collimator. Then, the output signal from the detector is calculated, and the collimator slit is aligned with the detector, moving the source-collimator system perpendicular relative to the plane of the fan-shaped beam and/or rotating it about the axis of rotation that passes vertically through the focus of the X-ray source, until the maximum output signal of the detector is reached. As yet a further option, the rotation and adjustment of the orientation of the collimator and the detector can be performed automatically, through actuators coupled to the collimator and to the detector.

Preferably, the portal is equipped with at least one optical detector that detects the presence of a vehicle in the portal. The detector, or multiple detectors, can include an active element mounted on the portal, and passive elements mounted on the vehicles, for example, on the roofs of the vehicles.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide further understanding of the invention and are incorporated in and constitute a part of this specification, illustrate embodiments of the invention and, together with the description, serve to explain the principles of the invention.

In the drawings:

FIG. 5 shows an electrical diagram of the apparatus ;

FIG. 6 is a schematic showing movement of a vehicle through the portal;

DETAILED DESCRIPTION OF THE PREFERRED EMBODIMENTS

Reference will now be made in detail to the preferred embodiment of the present invention, examples of which are illustrated in the accompanying drawings.

Figure 1:
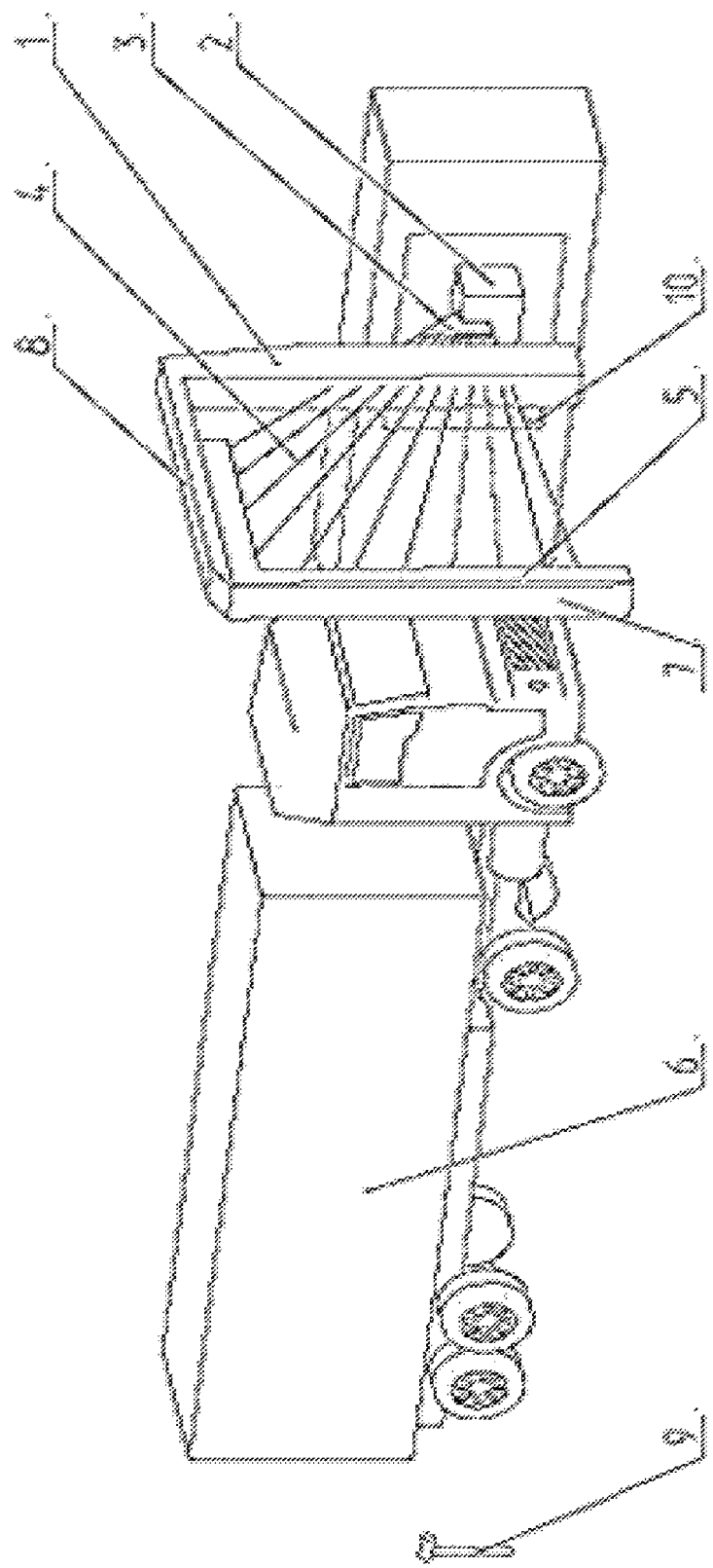
FIG. 1 illustrates an overall view of the apparatus.
Figure 2:
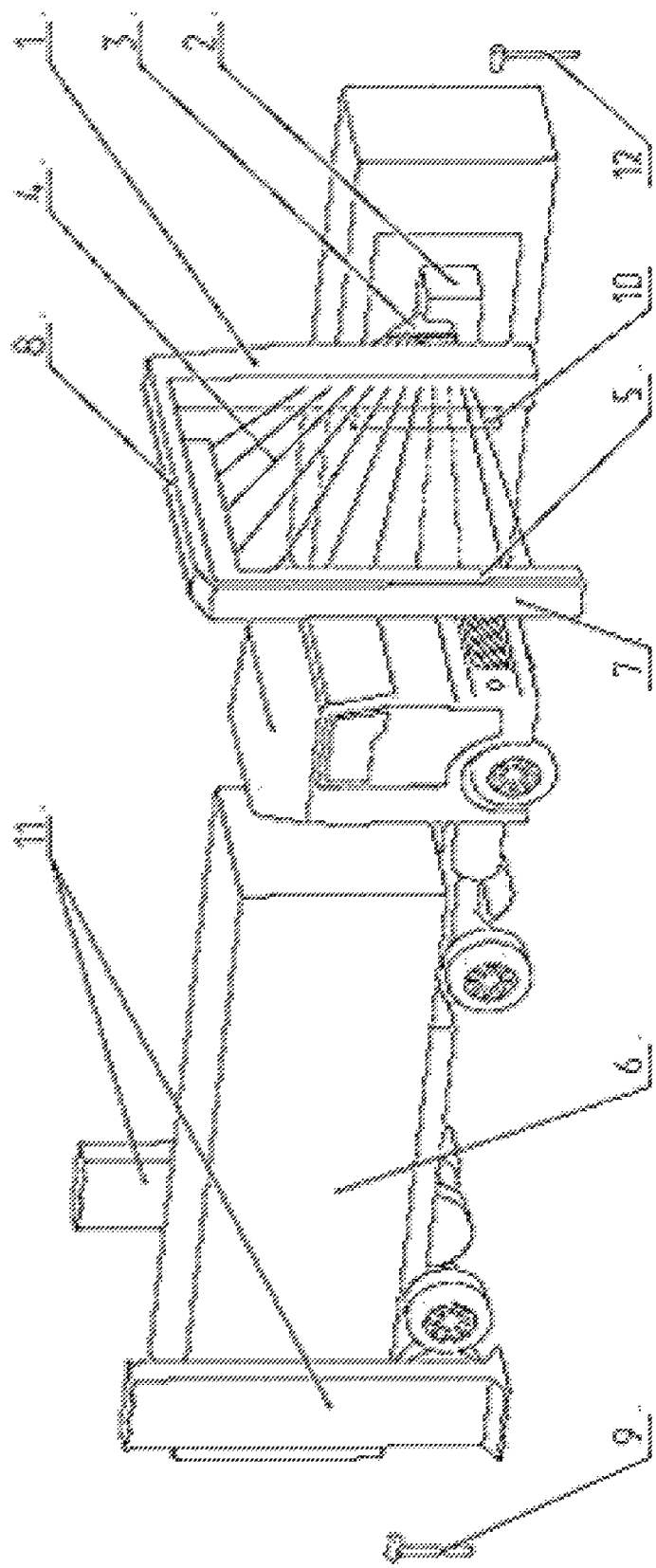
FIG. 2 shows another overall view of a preferred embodiment of the apparatus.
Figure 3:
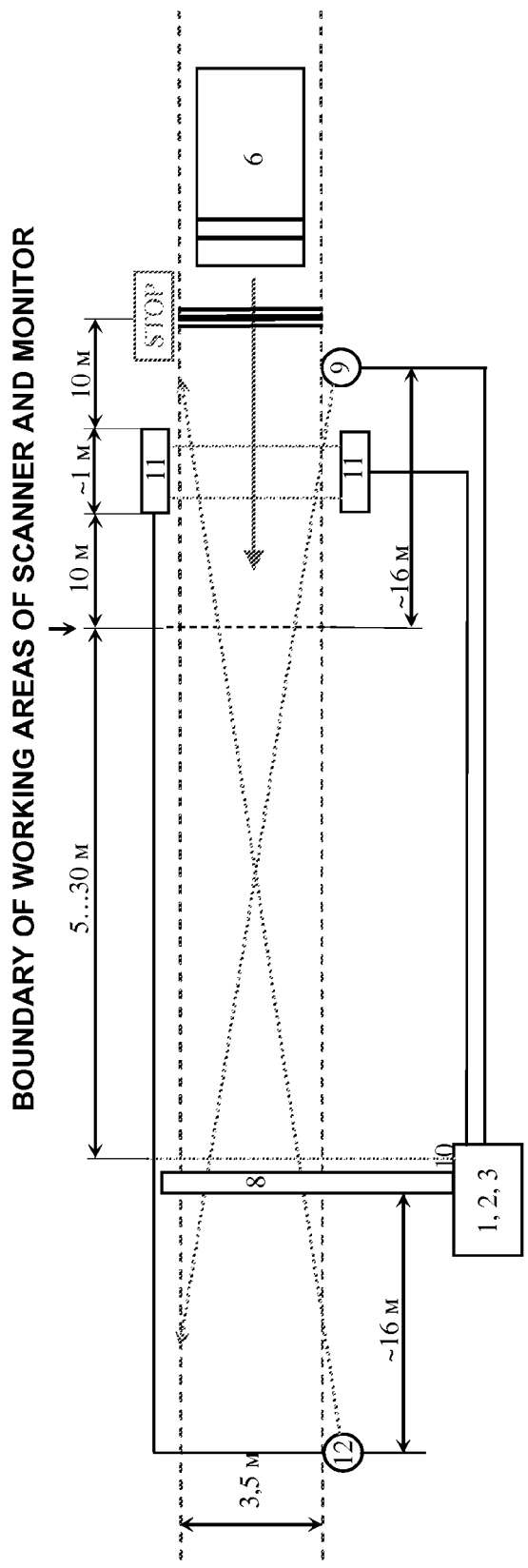
FIG. 3 shows a plan view of the portal of FIG. 2.

The apparatus for X-ray scanning of vehicles, according to the preferred embodiment, is shown in FIGS. 1, 2 and 3, and includes the portal 1, which has an X-ray radiation source 2 installed on one side. The X-ray source 2 includes a collimator 3, used for forming a fan-shaped X-ray beam 4. Opposite the source 2, a detector 5 is positioned, to receive the radiation passing through the vehicle, and to transform the received radiation into a digital electrical signal. In the illustrated example, the vehicle for which the radiation passes is designated by 6. In this example, the detector 5 is located on the vertical beam 7, and on the top horizontal beam 8 of the portal 1. A velocity measurement device 9 is also optionally included, to measure the speed of the vehicle 1. In the illustrated example, the velocity measurement device 9 is located forward of the portal 1 (relative to the movement of the vehicle), at a distance not less than the length of the vehicle. Just in front of the portal, a sensor 10 is located, to detect the presence of the automobile.

The scanning portal 1, shown in FIGS. 2 and 3, additionally includes a device for detection of radiation sources, typically in the form of a radiation portal 11, which is located in front of the portal 1 (relative to the direction of movement of the vehicle), at a distance at least equal to the length of the vehicle being measured (or greater), as well as a second sensor 12 of the speed of the vehicle, located directly after the portal 1 (relative to the direction of movement of the vehicle).

Figure 4A:
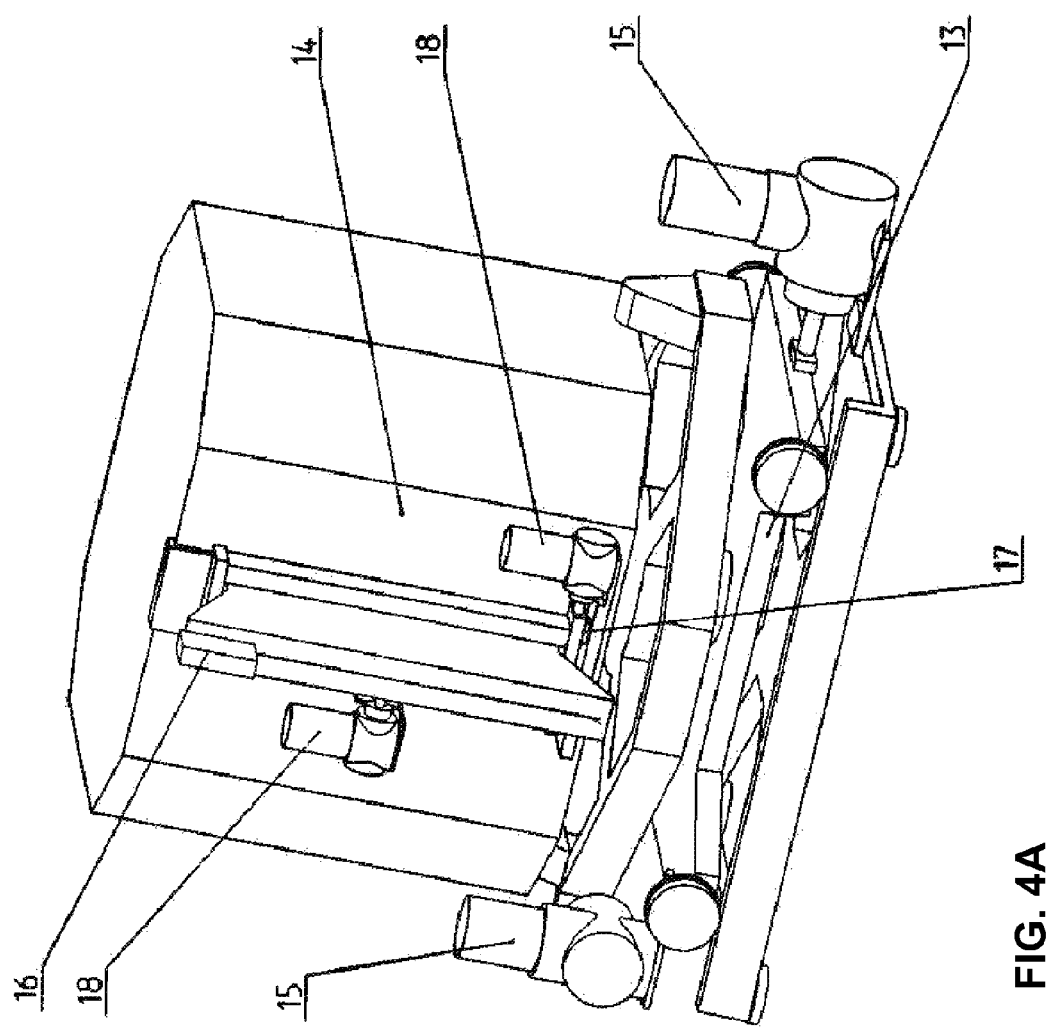
FIG. 4 shows an X-ray source as used in the portal of FIGS. 1-3, with FIG. 4A showing an isometric view, FIG. 4B showing a top view and FIG. 4C showing a cross section along A-A.
Figure 4B:
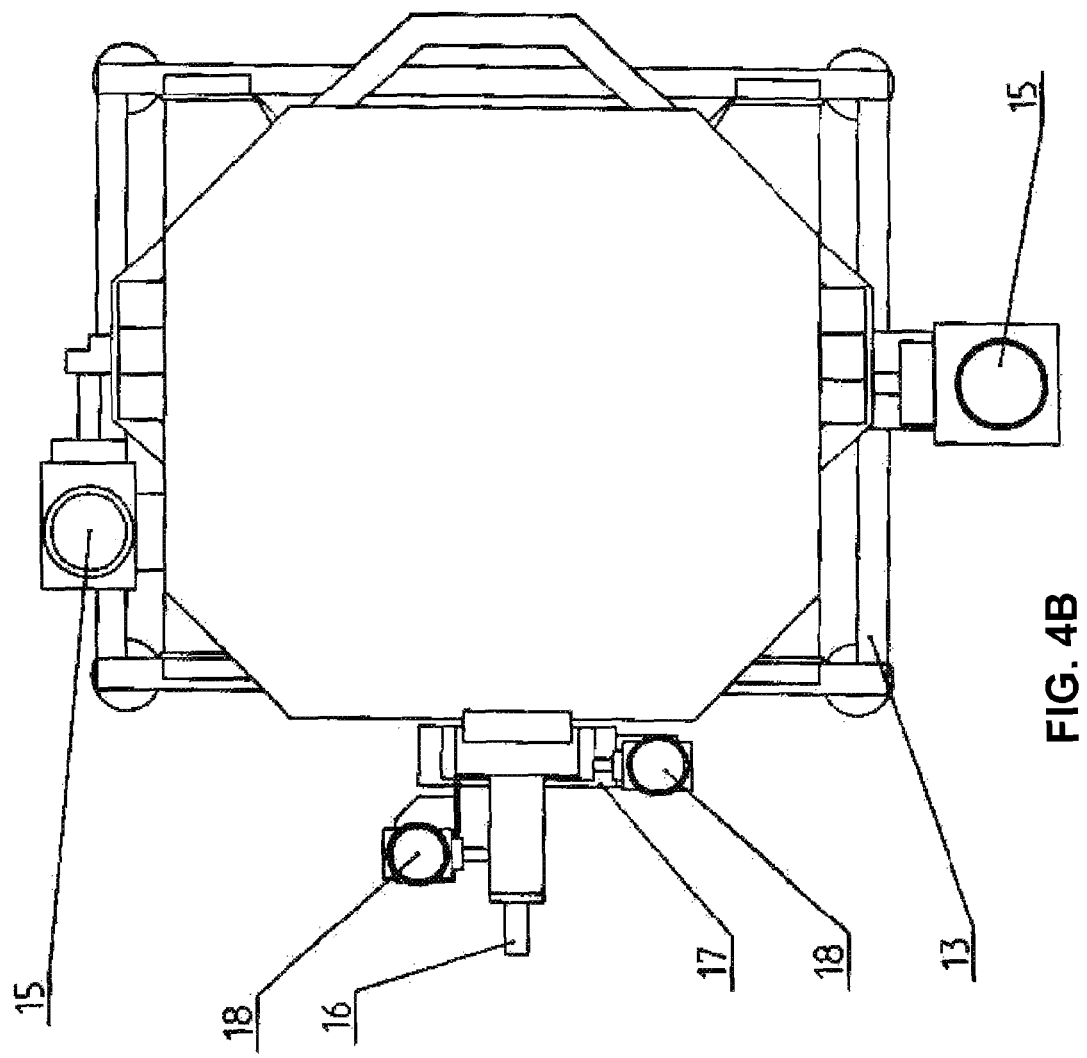
Figure 4C:
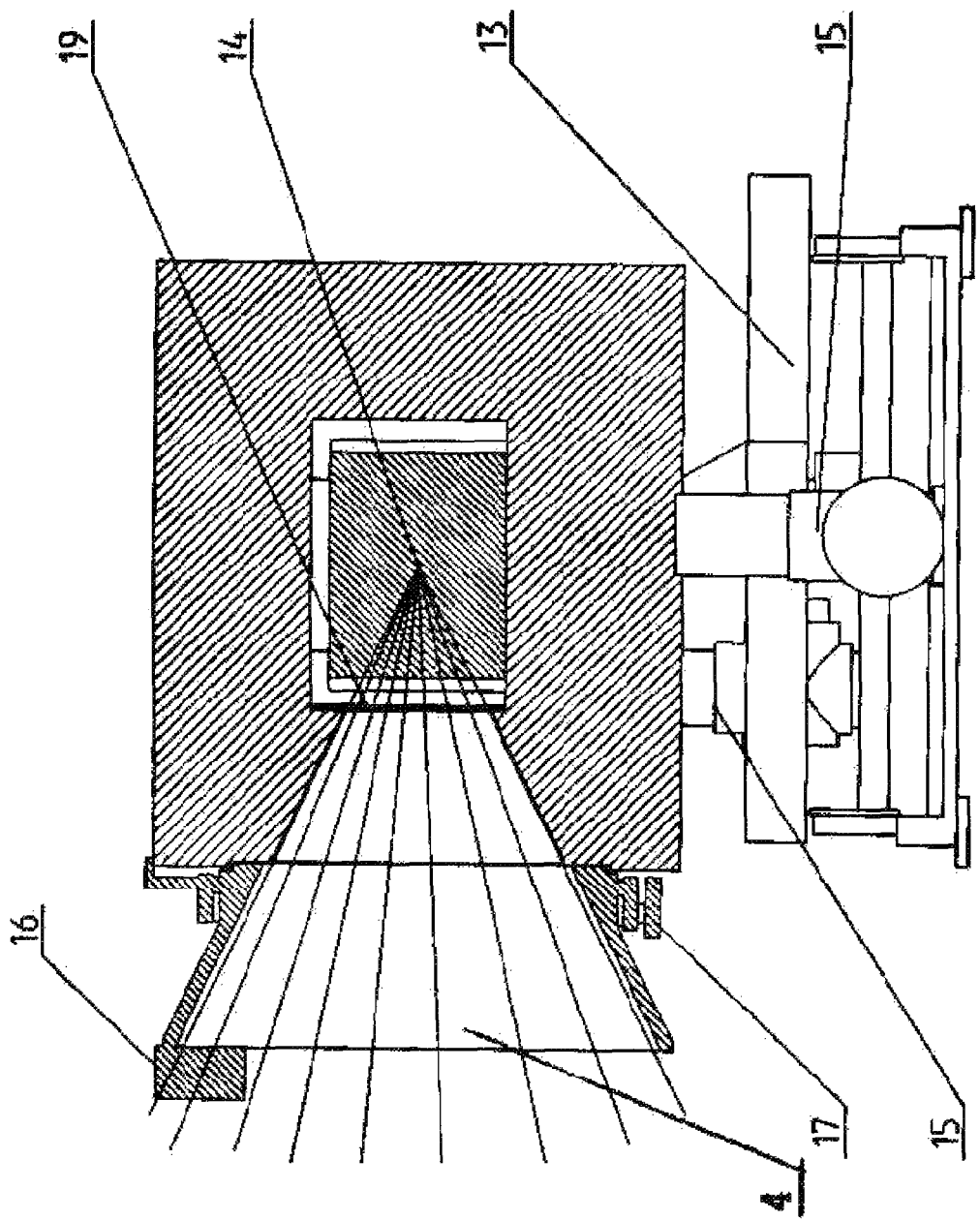

The X-ray source 2 is designed to emit X-ray radiation at a low intensity, but at a high energy of the photons, and is located on a first alignment platform 13 (see FIG. 4), which is capable of moving in a perpendicular direction relative to the plane of the fan-shaped beam 4, and capable of rotating about an axis that passes vertically through the focus 14 of the X-ray source 2. The platform 13 is also provided with motors 15, for moving the platform 13.

The collimator 3 is designed such that the fan-shaped beam 4 has a cross-section that is comparable to the width of the detector 5, in the plane of the detector 5 (which, in the exemplary embodiment is approximately 5 mm). A monitor 16, to monitor the primary beam, which is the radiation emitted from the collimator slit toward the detector, is located directly after the collimator 3. The collimator 3 is located on a second alignment platform 17, to enable its movement in a perpendicular direction relative to the plane of the beam 4, and its rotation about the axis that passes through the end of the collimator 3 that is closest to the focal point 14 of the X-ray source. The platform 17 is provided with motors 18, to enable its movement. In the preferred embodiment, a filter 19 is positioned between the X-ray source 2 and the collimator 3, to reduce the proportion of X-ray photons with low energies. The monitor 16, in the exemplary embodiment, includes 32 sensors, the same sensors that are used in the main detector 5.

As shown in the schematic in FIG. 5, the image formation block 20 includes a controller (control block) 21, which includes an interrogation unit 22 for scanning the detector 5, whose N−1 inputs are connected to the output of the detector 5, and the Nth input is connected to the output of the monitor 16. In the exemplary embodiment, the interrogation unit 22 for the detector is a separate unit", however, it can be a part of the control block 21. The synchronization input of interrogation unit 22 is connected to the output of the power supply (not shown in the figures) of the X-ray source 2, in order to synchronize the detector output to the X-ray source pulses. The output of the interrogation unit 22 is connected to the first signal input of the control block 21, and through it, to the image formation block 20. The second signal input of block 21 is connected to the output of the sensor 10, which indicates the presence of the vehicle. The third signal input of the control block 21 is connected to the speed measurement device 9, which is also connected to the power supply of the X-ray source 2 via the pulse frequency controller 23. The third input of the control block 21 is connected to the vehicle present sensor 10, and the fourth input of the control block 21 is connected to the radiation portal. The first and second outputs of the control block 21 are connected to the motors 15 and 18, correspondingly, and the third output of the control block 21 is connected to the power supply of the X-ray source 2, in order to enable to turn it off and on.

The output of image formation block 20 is connected to the display 24, to enable display of the X-ray scanned image 25.

The optical sensor 10 includes a stationary active part portion, and a set of passive portions, which can be attached by service personnel on the vehicles, for example, on the roofs or sides of the vehicles, which face the stationery active portion of the sensor 10, for example, in the front and back of the roof or side of the vehicle.

The proposed method for scanning vehicles is implemented as follows:

Prior to the scan, the alignment operation is performed. The X-ray source 2 generates a beam of X-rays using the collimator 3, which is in the form of a fan-shaped X-ray beam 4, whose cross sectional dimension is approximately in the plane of the detector 5 is comparable to the width of the detector 5.

Preferably, the collimator 3 slit is initially aligned with the direction of the maximum intensity of the radiation from the source. In order to achieve that, the output signal from the monitor 16 is fed into the control block 21, and the output of the control block 21 is provided to the motor 18, which moves the alignment platform 17, thereby moving the collimator 3 relative to the focal point 14 of the source 12, and perpendicular to the plane of the fan-shaped beam 4, and/or rotating it about its axis of rotation, which passes vertically through the end of the collimator 5 closest to the focal point 3, in order to achieve the maximum output value for the signal from the monitor 16.

Through the interrogation unit 22, the output signal from the detector 5 is transmitted to the control block 21. The output of the control block 21 is transmitted to the motor 18, which moves the alignment platform 13 together with the X-ray source 2, which is mounted on it, in a direction that is perpendicular to the plane of the fan-shaped beam 4, and/or rotating it about the axis of rotation that passes through the focal point 14, until the output signal of the detector 5 reaches the maximum.

As is well known, the exposure dose is proportionate to the area being irradiated. Therefore, by reducing the width of the fan-shaped beam, due to the use of a narrower collimator, leads to a decrease in the radiation dose received by the object being scanned, and also to a reduction in the amount of scattered radiation. U.S. Pat. No. 7,539,284 describes the use of a collimator with a narrow slit (instead of a broad beam) in order to reduce the radiation dose received by a patient in the course of a medical procedure. However, in that patent, the source of the radiation and the detector are both fixed on a rigid mounting fixture that is relatively small, compared to typical dimensions in the instant field of use.

Such small dimensions are obviously impractical for scanning of large objects, such as trucks and other vehicles. In order to scan such vehicles, the size of the scanning portal needs to be larger than the size of the vehicles. For example, the height of the scanning portal needs to be at least approximately 5 meters, and the width should be at least 8 meters. In order to implement the low dose fan-shaped X-ray radiation beam, the width of the beam is comparable to the width of the detector. However, in this case, given the overall dimensions of the scanning portal, a difficult problem of aligning the beam with the detector, and maintaining the beam alignment over time, needs to be addressed. This is achieved using the procedure described above.

The scanning process is shown schematically in FIGS. 6A-6D. When using the scanning portal shown in FIG. 1, the object being scanned—in this case, a cargo carrying vehicle 6—is stopped before it reaches the portal 1, at a distance of at least equal to the length of the vehicle. Note that the vehicle can be any number of vehicles, for example, a truck, a car, a container carrier, a trailer, a sea transported container, an air transported container, a railroad car, etc. Service personnel attach passive elements of tags, or beacons to the side or top portion of the vehicle, usually in the forward and rear portions of the vehicle. These can be, for example, polarized reflectors, or barcode symbols for recognition by a laser scanner of the sensor 10, which senses the presence of the vehicle, in order to identify where the vehicle starts and ends.

The driver receives permission to move forward, at a preferred speed, for example, 5-10 km per hour. When the vehicle 6 approaches the portal 1 (see FIG. 6A), its approach is monitored by using the sensor 10. Once the tag crosses a point where the scan begins, as detected by the sensor 10, the control block 21 transmits a signal to the X-ray source 2, to begin operation, where the X-ray source 2 forms the fan-shaped beam 4, aimed at the detector 5 at any given moment in time (see FIGS. 6B-6C).

The vehicle 6 crosses the fan-shaped beam 4, and the detector 5 receives the X-rays have passed through the vehicle 6. The detector 5 transforms the received X-ray radiation into a digital signal, which the interrogation unit 22 of the detector 6 reads from the detector with a frequency that corresponds to the frequency of the pulses of the radiation that is generated by the X-ray source 2. In the exemplary embodiment, typical pulse frequency is 200-400 Hz, and the energy per pulse is an adjustable parameter that can be varied widely, e.g., from 1 μGy to 1 mGy per pulse. The pulse frequency of 400 Hz is set as default value for vehicle speed of 5 km/h, but it can be adjusted if needed. Automatic regulation of pulse frequency is based on linear relationship between pulse frequency and vehicle speed starting from the reference point (400 Hz, 5 km/h). Once the tag on the tail end of the vehicle passes the sensor 10, the X-ray source 2 is turned off, the scanning process stops, and the X-ray source 2 returns to a passive mode, without emitting any radiation. As an alternative, a sensor can be used to determine the start and end of a vehicle. For example, sensors such as IR barriers, can be used to automatically determine where the vehicle starts/ends. Using such sensors allows avoiding slow manual attachment of bar codes or reflectors if the whole vehicle, including the driver's cabin is routinely scanned.

Thus, the vehicle 6 container is being inspected, whether large or small, can follow each other at an interval that is approximately equal to the length of the vehicle itself. Also, a relatively high throughput of the scanning portal is maintained, even for large vehicles such as trucks and container carriers.

Depending on the decision by the portal operator, either—only the cargo-carrying portion of the vehicle can be scanned, or the entire vehicle can be scanned. In the latter case, the tags, polarized reflectors or barcodes can be attached to the front of the cabin, in order to insure that the cabin where the driver is also scanned.

If the speed of the vehicle increases or decreases, based on the speed measurement device 9, the pulse frequency controller 23 correspondingly increases or decreases the frequency of the pulses, thereby maintaining spatial resolution, the exposure dose and the scattered radiation parameters. Automatic regulation of pulse frequency can be based on linear relationship between pulse frequency and vehicle speed starting from the preset reference point, e.g., 200 Hz for 5 km/h. When the vehicle speed V, which is measured by speed measurement device 9, becomes greater or lower than a reference speed (e.g., 5 km/h), a new value for pulse frequency is calculated by the pulse frequency regulator as $F_{new}=F_{ref}/V_{ref}*V$, where $F_{ref}$—reference frequency (200 Hz), $V_{ref}$—reference speed (5 km/h). The pulse frequency controller sends new value $F_{new}$ to the accelerator power supply unit that, in turn, changes accelerator parameters to allow new frequency value starting from the next radiation pulse. Additionally, in the event of the output signal from the speed measurement device 9 approaching a predefined minimum threshold, or disappearing altogether, control block 21 can generate a signal that will turn off the X-ray source 2. Thus, the scanning of the vehicle will be stopped, if the vehicle itself stops, or moves too slowly. Typically, in such an event, the scanning procedure will need to begin again. This also achieves maximum radiation safety for the people involved or potentially involved, such as illegal migrants and/or vehicle drivers.

Figure 9:
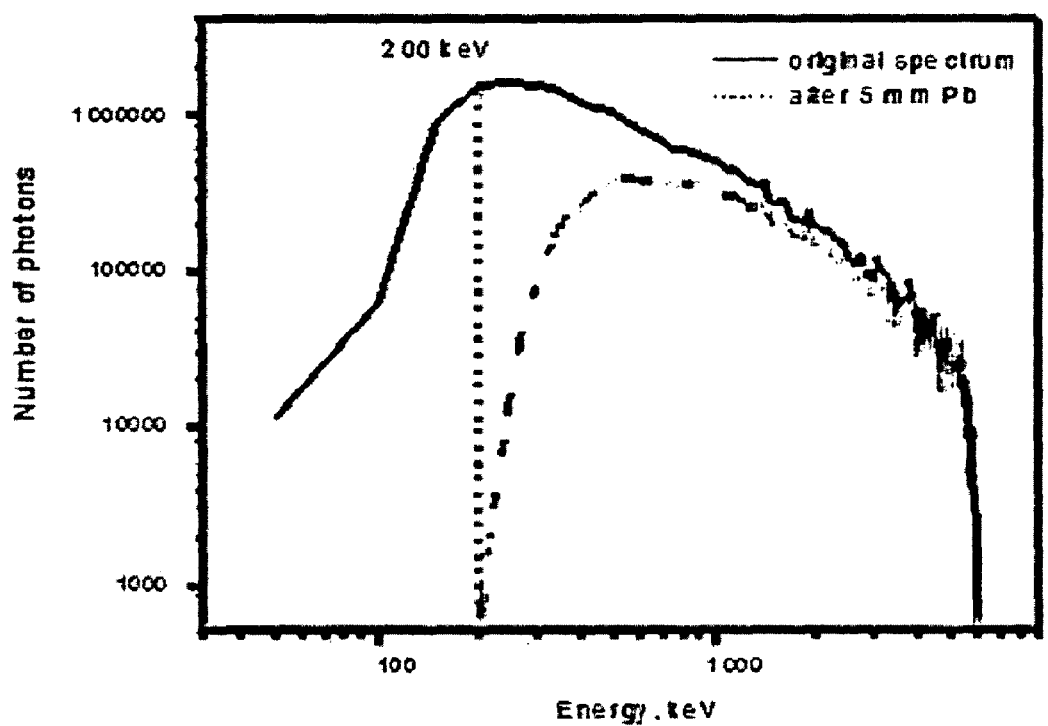
FIG. 9 shows the effect of a filter on the X-rays.

Preferably, the X-ray radiation is filtered, to reduce the proportion of photons with low energy. Use of such filters is generally known, and is often used to reduce the dose of radiation received by a patient in medical X-ray systems. A similar approach to reduce the radiation dose received by a vehicle, and to reduce the amount of scattered radiation, can be applied as well to inspection systems for X-ray scanning of cargo, by using X-ray radiation with a relatively high energy, for example, 3-9 MeV, see, for example, U.S. Pat. No. 6,459,761. Such filters are preferably made of material of high atomic number, e.g., lead or tungsten, although other materials like steel can also be used. Photons with low energy, e.g., lower than 0.5 MeV, are attenuated more than photons with higher energy, therefore, the filtered beam contains less low energy photons. Because low energy photons contribute to the dose to object but do not reach the detector through the dense object, beam filtering significantly reduces the dose to the object with much smaller reduction in the detector signal. For example, for 5 MeV source and the object with equivalent thickness of 100 mm steel, the dose reduction of 60% can be achieved by using 5 mm lead filter with only 30% reduction in detector signal. In the exemplary embodiment, the cross-section of the beam is a Gaussian. A beam width substantially the same width as the detector means that HWHM of Gaussian is roughly the same as the detector pixel height (5 mm). Exemplary tests using the proposed apparatus 1 showed that when using high energy x-rays (2.5 to 9 MEV, preferably approximately 5 MEV, or 4.5 to 5.5 MeV), from a low power impulse X-ray source 2 (with an output of at most 20 roentgen per hour), both the driver of the vehicle and any people located in the cargo area receive a radiation dose that is no greater than 1 μSV. Since the width of the fan-shaped beam 4 is relatively low, and the beam is aligned with the detector, typical radiation dose received by the driver is usually no greater than 0.02 μSv. By way of comparison, ICCR 2007 establishes an annual radiation dose from nonmedical sources of no greater than 1,000 μSv. Thus, the objective of reducing the radiation dose received by humans in the scanning portal has been successfully achieved. FIG. 9 shows the effect of the added filter 19 (5 mm Pb), which eliminates about 50% of all photons from the original spectrum (which has a maximum at 5 MeV), leaving only high-energy photons with energies above 200 keV, while the number of photons between 200 and 500 keV is significantly reduced.

The output signal from the speed measurement device 9 is also provided to a third input of the control block 21, from where it is sent to the image formation block 20, which in turn permits reducing various geometric distortions that are caused by uneven movement of the vehicle 6. The algorithm for correction of the geometric distortions can be the same or similar to what is described in U.S. Pat. No. 7,453,614, for reducing inhomogeneities in spatial resolution of an image due to variations in distance between the detector and the object. The difference here is that unlike the differences in the distance, described in U.S. Pat. No. 7,453,614, it is variations in the speed of movement of the vehicle (object) that are being adjusted for. Preferably, the elementary scanned lengths of the vehicle between successive radiation pulses are calculated based on the corresponding speed of the vehicle and radiation pulse frequency known for each radiation pulse. Then each image line is interpolated by using any known interpolation algorithm, such as linear or cubic interpolation, and new image signals are calculated line by line for a new pixel set, for which the elementary scanned length of the vehicle is the same for any successive pixels in a line, where it corresponds to the preset reference vehicle speed (preferably 5 km/h).

Figure 7B:
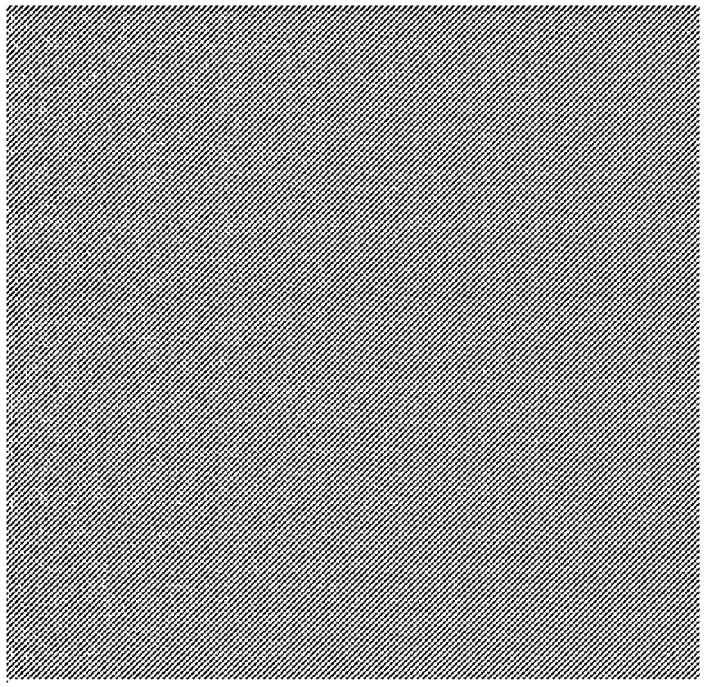
FIG. 7 shows how fluctuations in the intensity of radiation from pulse to pulse are corrected by using a monitor/detector of the primary fan-shaped beam.
Figure 7A:
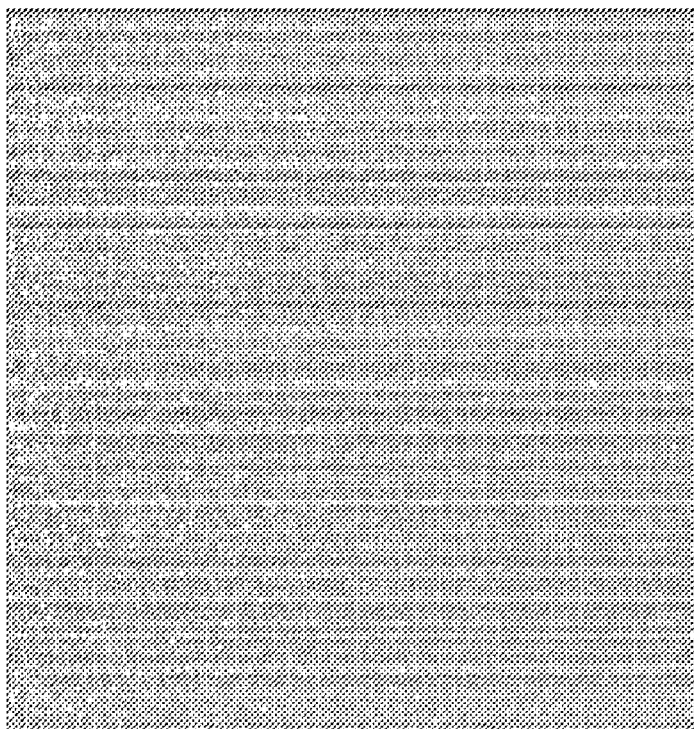

The impulses from the x-ray source 2 have an amplitude that varies randomly or pseudo randomly as a function of time, which also leads to the same variation in the output signals from the detector 5 (see FIG. 7A). This leads to a reduction in the accuracy and reliability of the scanning process. To eliminate this effect, impulses from the x-ray source 2 are also got by the primary beam 16, which is in the form of one of the sections that is analogous to the section of the detector elements that transform the x-ray signals to electrical signals. During the scanning process, the output signals from the monitor 16 are provided to the N signal input of interrogation unit 22. In control block 21, the signals are averaged, and the averaged value is used to normalize the output of the detector by dividing the detector sensors' signals for each radiation pulse by the averaged monitor 16 signal for the same pulse and multiplying the result by some integer constant. This eliminates the feedback effect due to varying amplitude of the x-ray impulses (see FIG. 7B), which also leads to a further improvement in the quality of the image.

Figure 8A:
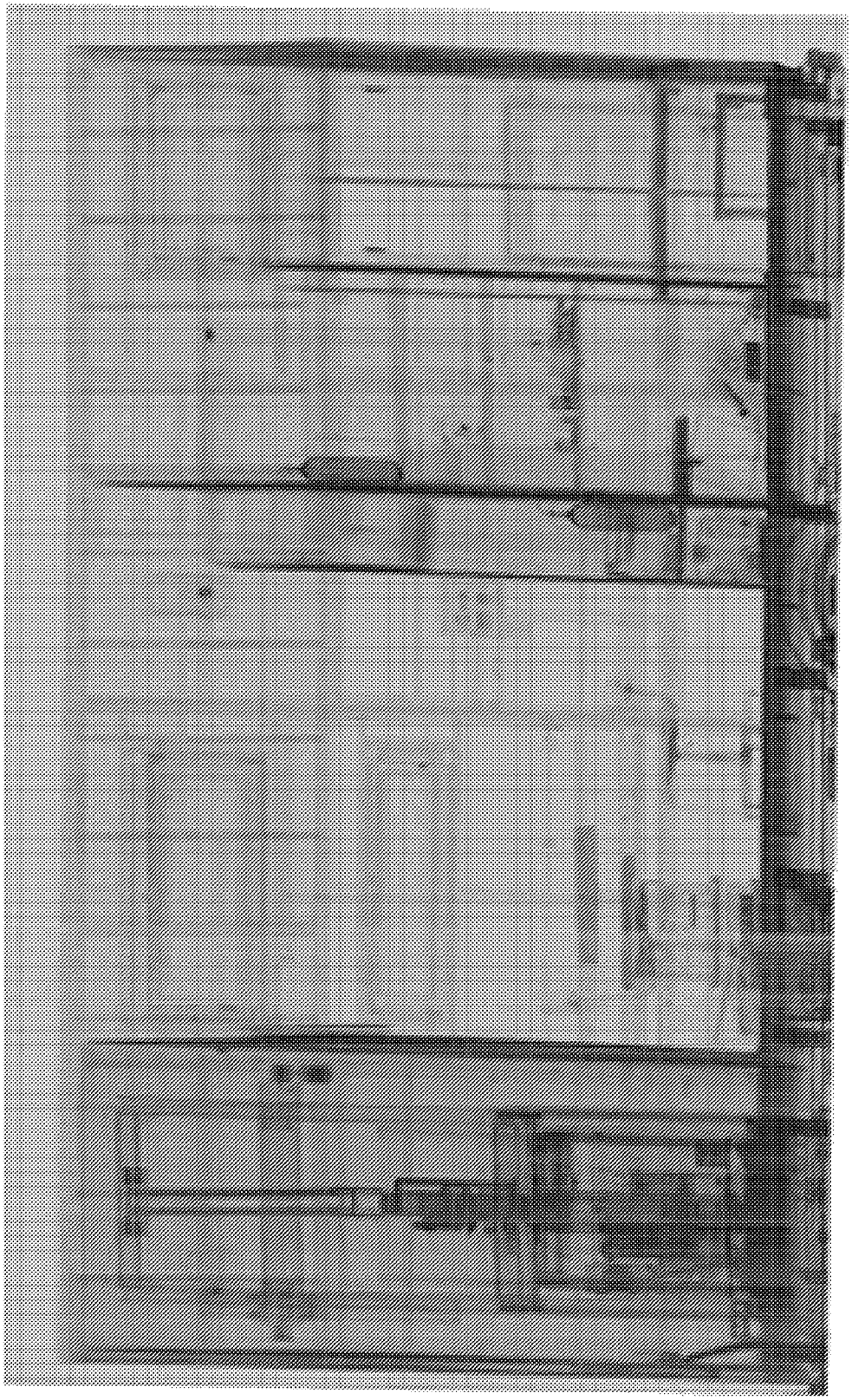
FIG. 8 illustrates examples of images received from an inspection of loaded vehicles and the inspection of loaded vehicles together with the driver's cabin.
Figure 8B:
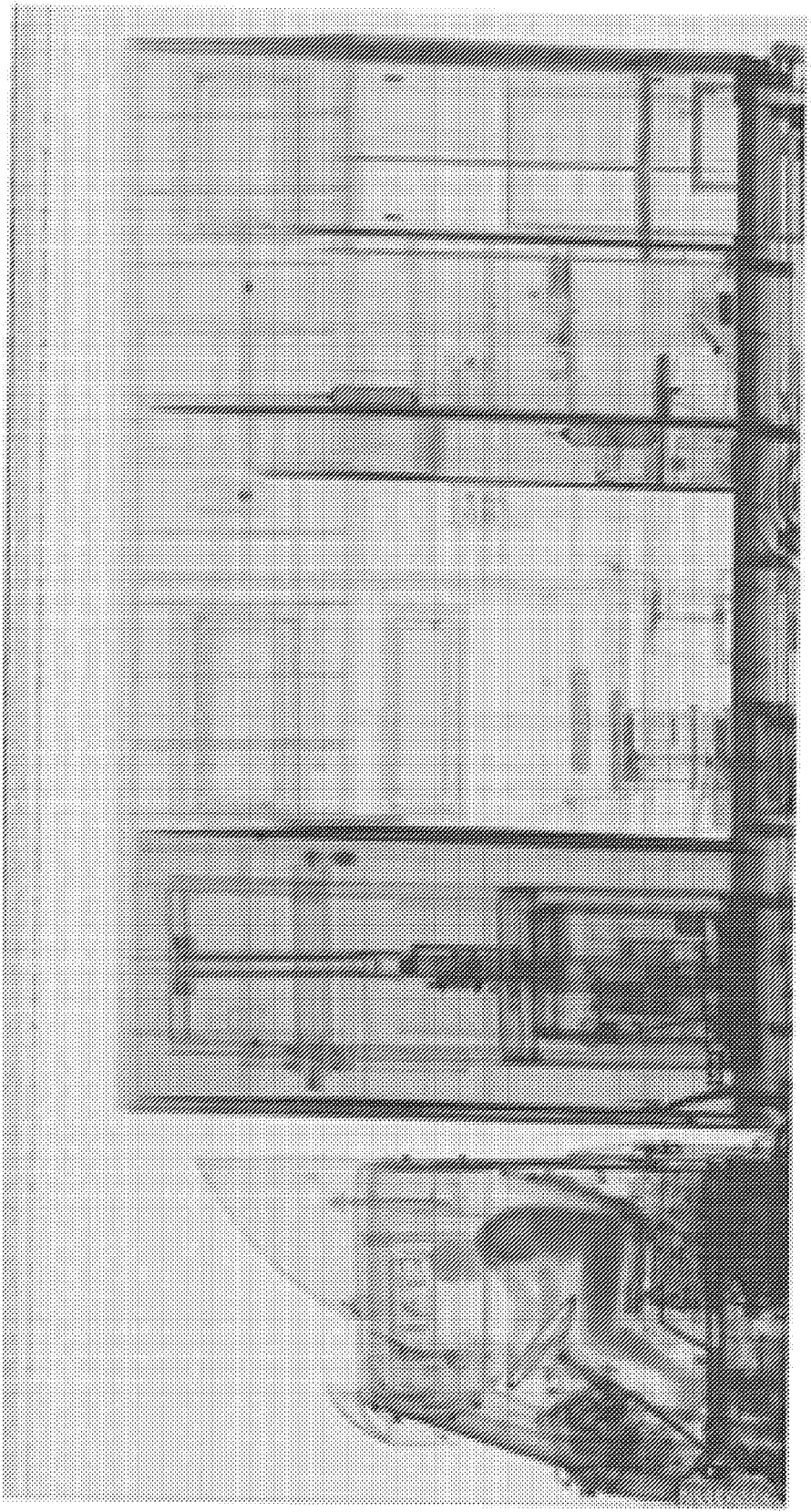

Based on the x-ray radiation data received by the detector 5 and the output of the vehicle speed sensor 9, the image is formed, for example, as shown in FIG. 8 and is provided to a display. The image under the display can be analyzed by an operator, looking for contraband, prohibited items, hidden compartments, etc. Depending on the results, the operator can give the driver permission to proceed, or can direct the vehicle to a separate area for closer inspection.

When using the scanning portal shown in FIG. 2, the vehicle 6 is stopped before the radiation portal 11. Service personnel attach passive tags or beacons to the side of the vehicle, such as bar codes, polarizing reflectors, etc., for their detection by a laser or barcode scanning system that is part o the sensor 10. This is done in order to identify the points where the scan should begin and end.

The driver is then given permission to proceed forward at an approximate speed of 5-10 kilometers per hour. The speed of the vehicle is monitored by the speed measurement device 12, and the presence of radioactive materials in the vehicle is detected directly by the radiation portal. The output signal of the speed measurement device 12 is provided to the radiation portal 11, which generates an output signal taking into account the speed of the vehicle. The output signal from the portal 11 is provided to the control block 21.

The X-ray scanning of the vehicle is performed as discussed above.

The control block 21 converts the received electrical signals into a coordinate system, based on the received x-ray data, the measured speed of the vehicle, the location of the vehicle, etc. The data is combined and can be stored in a database. Thus, the proposed system and method provide for a reliable inspection and control over transportation of dangerous and radioactive substances, while maintaining all the advantages described above.

Having thus described a preferred embodiment, it should be apparent to those skilled in the art that certain advantages of the described method and apparatus can be achieved. It should also be appreciated that various modifications, adaptations and alternative embodiments thereof may be made within the scope and spirit of the present invention. The invention is further defined by the following claims.

What is claimed is:

1. An apparatus for X-ray scanning of vehicles, comprising:
   a pulsed X-ray source generating X-rays;
   a collimator forming a fan-shaped beam from the X-rays;
   a detector detecting the fan-shaped beam after it passes through a vehicle;
   a speed sensor that measures a speed of the vehicle passing through the apparatus and providing an electrical output corresponding to the speed;
   an image formation module that converts an output of the detector into an image of the vehicle, based on the measured speed of the vehicle;
   wherein a cross-section of the fan-shaped beam is substantially similar to a width of the detector;
   wherein more than 50% of the X-rays comprise photons with maximum energy between 2.5 and 9 MeV;
   wherein a frequency of the pulses is adjusted based on the speed of the vehicle; and
   wherein prior to the scanning, the fan-shaped beam is aligned with the detector by adjusting position or orientation of the X-ray source and of the collimator to maximize an electrical output of the detector.

2. The apparatus of claim 1, further comprising a filter adjacent to the collimator for filtering out low energy X-ray photons.

3. The apparatus of claim 1, further comprising a vehicle presence sensor, wherein output of the vehicle presence sensor is used to turn the X-ray source on and off.

4. The apparatus of claim 1, further comprising an alignment platform for aligning the fan-shaped beam with the detector.

5. The apparatus of claim 1, wherein the X-ray source is turned off if the speed of the vehicle is below a predetermined threshold.

6. The apparatus of claim 1, wherein the output of the detector is normalized based on an average reading of a primary beam.

7. The apparatus of claim 1, wherein the alignment is performed by aligning a slit of the collimator with a direction of maximum X-ray beam intensity from the X-ray source.

8. The apparatus of claim 1, wherein the alignment is performed by its movement of an alignment platform in a perpendicular direction relative to a plane of the fan shaped beam.

9. The apparatus of claim 1, wherein the alignment is performed by rotation of the collimator.

10. The apparatus of claim 1, wherein the apparatus detects radioactive objects in the vehicle.

11. The apparatus of claim 1, wherein the X-rays comprise primarily photons with maximum energy between 4.5 and 5.5 MeV.

12. The system of claim 1, further comprising a monitor receiving radiation from the collimator, the monitor used for beam alignment.

13. A method of scanning a vehicle, the method comprising:
   generating X-rays from a pulsed X-ray source;
   forming a fan-shaped beam from the X-rays;

aligning the fan-shaped beam by adjusting position or orientation of the X-ray source and of the collimator to maximize an electrical output of a detector detecting the fan-shaped beam;

measuring a speed of the vehicle being scanned and providing an electrical output corresponding to the speed;

forming an image of the vehicle by converting an output of the detector into an image of the vehicle, based on the electrical output corresponding to the measured speed of the vehicle;

maintaining a cross-section of the fan-shaped beam substantially similar to a width of the detector, wherein a frequency of the pulses is adjusted based on the speed of the vehicle, and wherein the X-rays comprise primarily photons with maximum energy between 2.5 and 9 MeV.

14. The method of claim 13, further comprising filtering out low energy X-ray photons.

15. The method of claim 13, further comprising turning the X-ray source on and off based on a signal from a vehicle presence sensor.

16. The method of claim 13, further comprising aligning the fan-shaped beam with the detector.

17. The method of claim 13, further comprising aligning a slit of the collimator with a direction of maximum X-ray beam intensity from the X-ray source in order to align the fan-shaped beam.

18. The method of claim 13, further comprising moving an alignment platform in a perpendicular direction relative to a plane of the fan shaped beam.

19. The method of claim 13, further comprising rotating the collimator to align the fan-shaped beam.

20. The method of claim 13, further comprising detecting radioactive objects in the vehicle and generating an output signal based on the speed of the vehicle.

21. The method of claim 13, wherein the X-rays comprise primarily photons with maximum energy between 4.5 and 5.5 MeV.

\* \* \* \* \*